(12) United States Patent
Doi et al.

(10) Patent No.: US 6,247,010 B1
(45) Date of Patent: Jun. 12, 2001

(54) RELATED INFORMATION SEARCH METHOD, RELATED INFORMATION SEARCH SYSTEM, AND COMPUTER-READABLE MEDIUM HAVING STORED THEREIN A PROGRAM

(75) Inventors: Shinichi Doi; Shinichiro Kamei; Shinko Tamura, all of Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/144,529

(22) Filed: Aug. 31, 1998

(30) Foreign Application Priority Data

Aug. 30, 1997 (JP) .................................................. 9-249714

(51) Int. Cl.$^7$ ...................................................... G06F 17/30
(52) U.S. Cl. ...................... 707/3; 703/4; 703/6; 703/10; 703/203; 703/531; 709/203
(58) Field of Search .................................. 707/2, 3, 4, 5, 707/6, 10, 102, 203, 531; 709/9, 10, 6, 203; 395/145, 600; 345/349; 704/1, 9; 705/1, 8

(56) References Cited

U.S. PATENT DOCUMENTS

| | | | |
|---|---|---|---|
| 4,456,973 | * | 6/1984 | Carlgren et al. ............................ 704/1 |
| 5,168,533 | * | 12/1992 | Kato et al. ................................. 382/54 |
| 5,278,980 | * | 1/1994 | Pedersen et al. ......................... 395/600 |
| 5,280,573 | * | 1/1994 | Kuga et al. .............................. 395/145 |
| 5,297,042 | * | 3/1994 | Morita ................................ 364/419.19 |
| 5,410,692 | * | 4/1995 | Torres ........................................ 707/3 |
| 5,523,945 | * | 6/1996 | Satoh et al. ......................... 364/419.08 |
| 5,857,188 | * | 1/1999 | Douglas ..................................... 707/9 |
| 5,907,841 | * | 5/1999 | Sumita et al. .............................. 707/6 |
| 5,930,787 | * | 7/1999 | Minakuchi et al. ........................ 707/4 |
| 5,940,800 | * | 8/1998 | Bennett et al. ............................ 705/1 |
| 5,982,369 | * | 11/1999 | Sciammarella et al. .................. 707/6 |
| 5,987,460 | * | 11/1999 | Niwa et al. ................................ 707/6 |
| 6,012,055 | * | 1/2000 | Campbell et al. ......................... 707/5 |
| 6,098,065 | * | 8/2000 | Skillen et al. ............................. 707/3 |
| 6,098,092 | * | 8/2000 | Padzensky ............................. 709/203 |

FOREIGN PATENT DOCUMENTS

| | | |
|---|---|---|
| 3-154152 | 7/1991 | (JP) . |
| 7-134720 | 5/1995 | (JP) . |
| 9-69087 | 3/1997 | (JP) . |

* cited by examiner

*Primary Examiner*—Kim Vu
*Assistant Examiner*—Anh Ly
(74) *Attorney, Agent, or Firm*—Foley & Lardner LLP

(57) ABSTRACT

A system according to the present invention searches for information related to entered text and presents searched information to a user with a minimum interruption to user's document formulating work. An input analyzing module 11 analyzes text entered by the user and extracts a search key. A related information searching module 12 searches a related information storage device 3 for information on the search key. A storage module 16 stores therein the search results collected for a plurality of past search keys including the latest search key and the positional information on each search key within a document. A controlling module 13 searches the storage module 16 for the search key corresponding to the position of a cursor. The controlling module issues an instruction to change a search button to a first display format if there is no related information, or an instruction to change the search button to a second display format if there is related information. In response to the instruction, a search instruction accepting module 14 changes the format of the search button on a display device 22. When the user backspaces the cursor to a previously-extracted search key, the system searches the storage module 16 again for information on the previously-extracted search key and changes the format of the search button according to the search result.

16 Claims, 15 Drawing Sheets

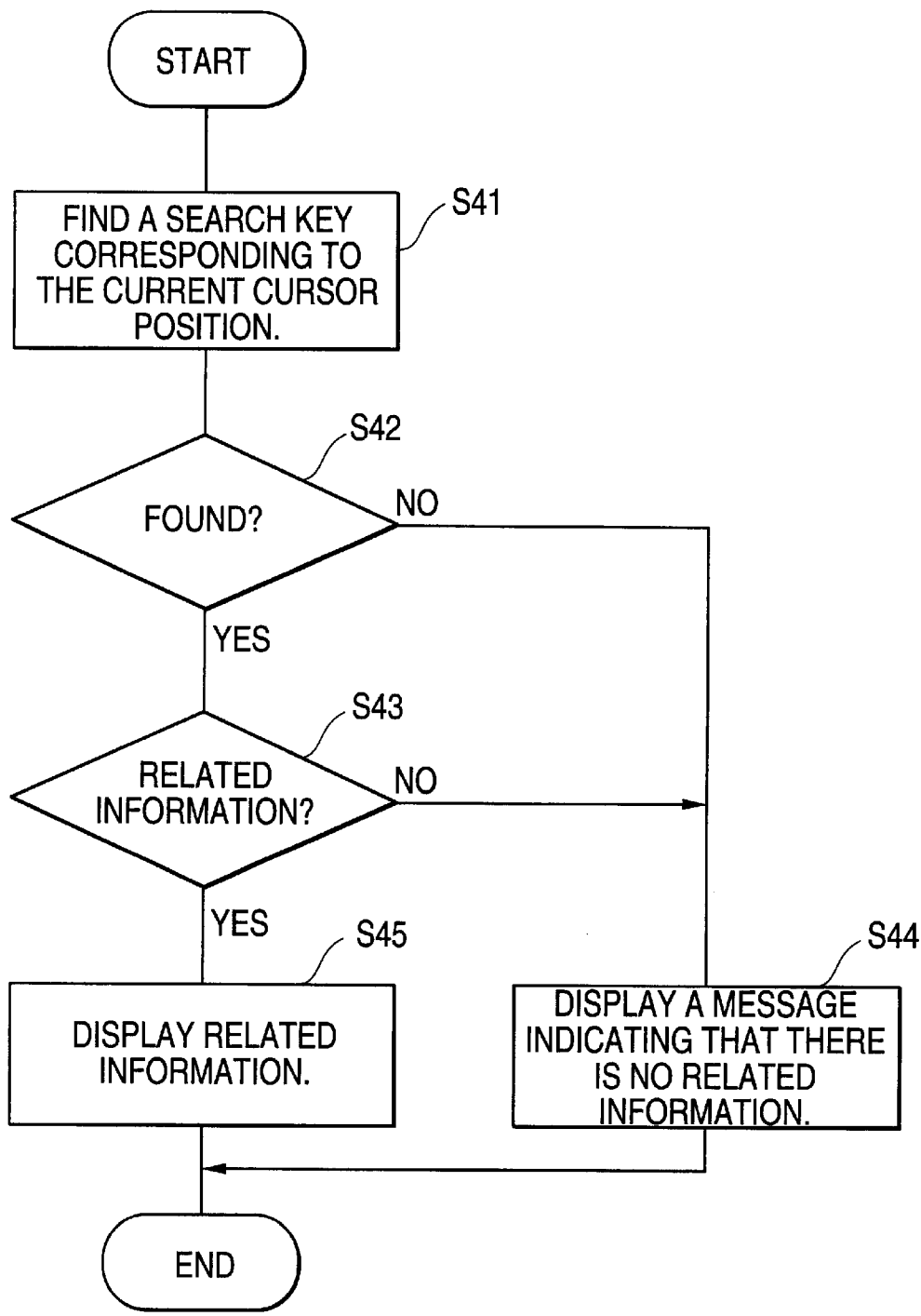

FIG. 10(A)    FIG. 10(B)
1)  
2)  
3)  
4)  
5)  
6)  
7)  

FIG. 11(A)   FIG. 11(B)   FIG. 11(C)
1) 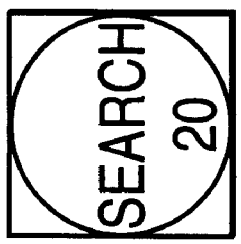   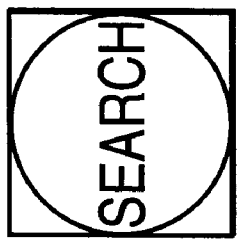
2)    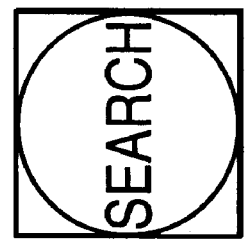

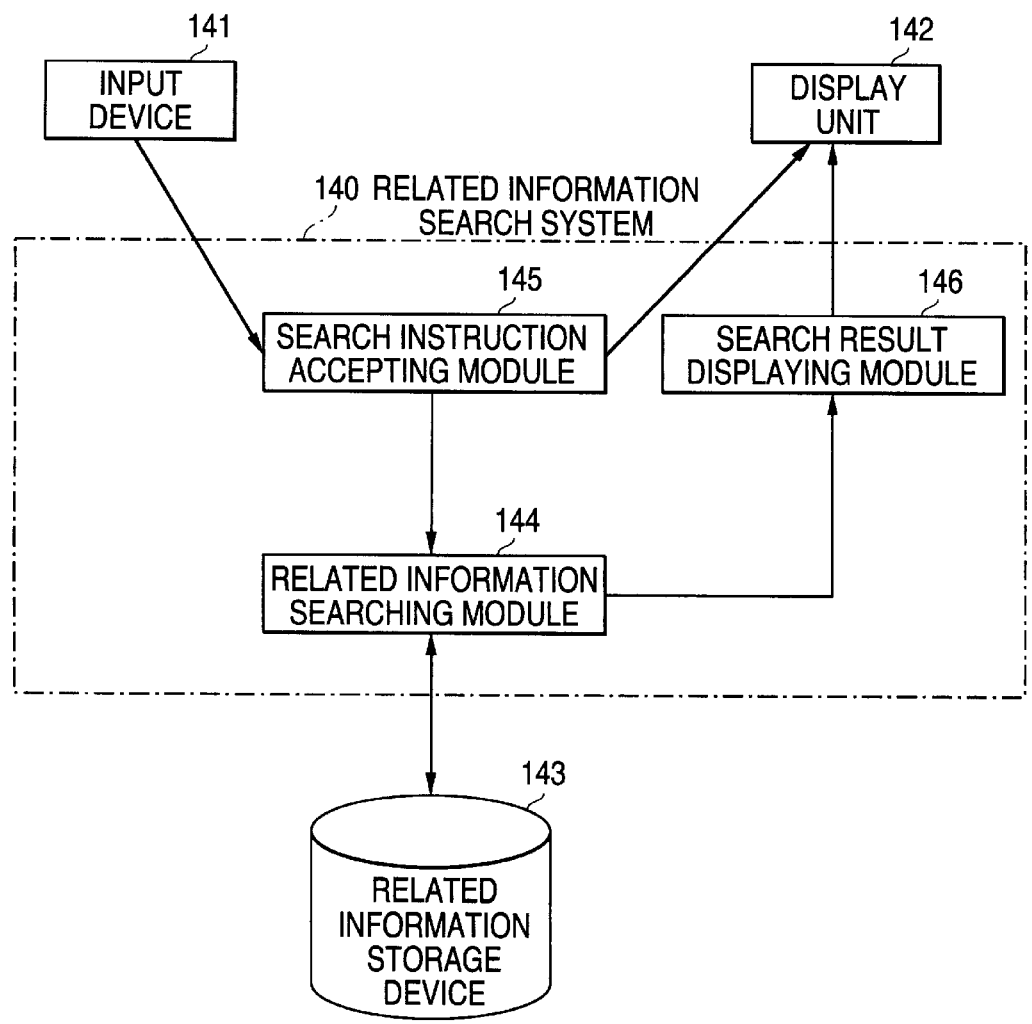

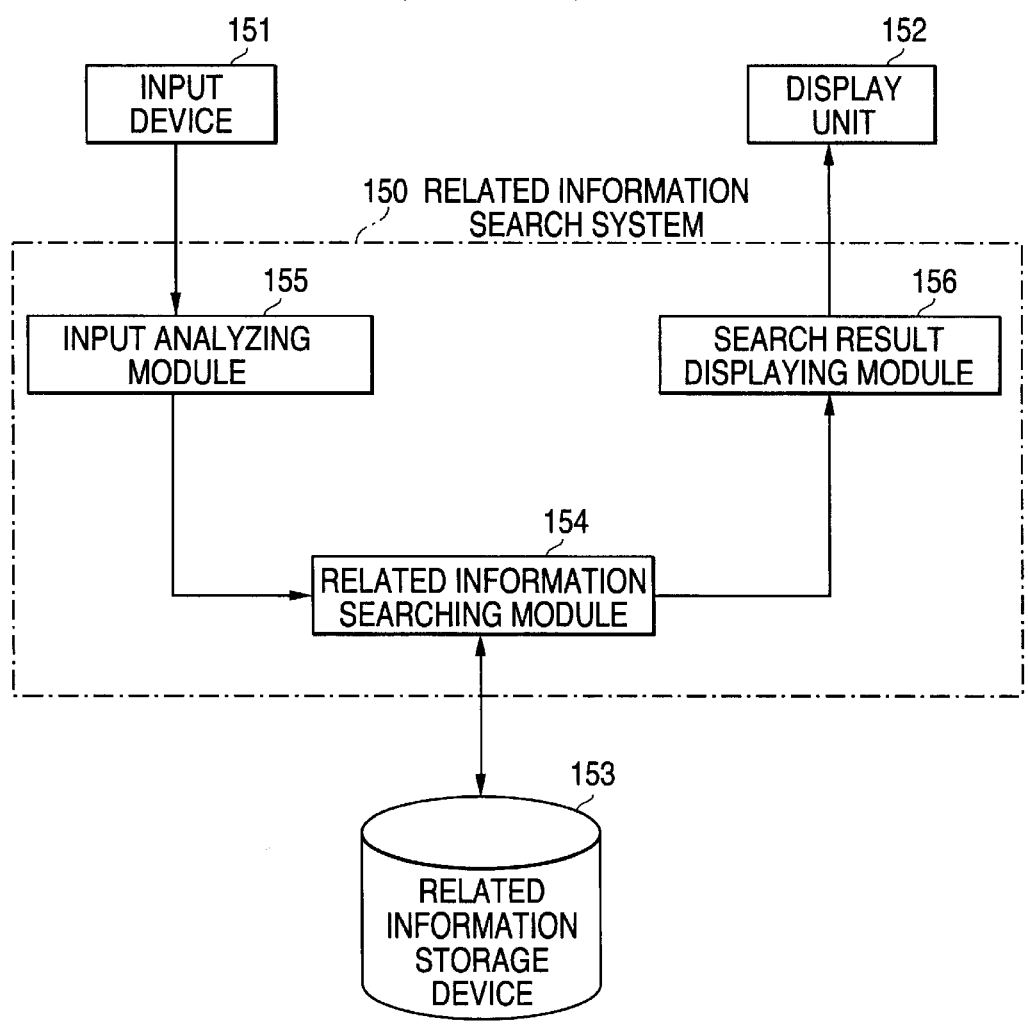

RELATED INFORMATION SEARCH METHOD, RELATED INFORMATION SEARCH SYSTEM, AND COMPUTER-READABLE MEDIUM HAVING STORED THEREIN A PROGRAM

FIELD OF THE INVENTION

The present invention relates to a technology for helping a user formulate or draft documents, and more particularly to a method and a system used to search for information related to a document to be formulated and to present the searched information to the user.

BACKGROUND OF THE INVENTION

Description of the Related Art

The following systems are provided as a related information search system which searches for information related to a document to be formulated and presents it to the user in order to help him or her formulate the document.

(1) First conventional system

A first conventional system is one of the most widely used systems today. Upon receiving a search instruction from a user, the system searches for information related to a search key entered by the user and presents the related information to the user. FIG. 14 shows the block diagram.

In response to a user's search instruction, a related information search system 140 searches for information related to an entered search key and presents the searched information to the user. The system comprises a search instruction accepting module 145, a related information searching module 144, and a search result displaying module 146. An input device 141 is a pointing device such as a mouse or a keyboard, and a display unit 142 is a CRT display and so on. A related information storage device 143, a storage device such as a hard disk or a CD-ROM, contains a database in which text, documents/(translation) sample sentences, dictionary information, words, and Kanji samples etc. are stored. A search instruction accepting module 145 first displays on the display unit 142 the interaction elements (search button, dialog box, and so on) for accepting user's instructions and search keys and then accepts user's instructions and search keys from the input device 141 for transmission to the related information searching module 144. The related information searching module 144 searches the related information storage device 143 for information related to the search keys. This information includes text or (translation) sample sentences containing a search key and dictionary information containing a search key as the head word. A search result displaying module 146 displays the search result on the display unit 142.

(2) Second conventional system

A second conventional system is a related information search system disclosed in Japanese Patent Publication Kokai JP-A No. Hei 7-134720 and Japanese Patent Publication Kokai JP-A No. Hei 9-69087. The system analyzes text entered by a user to formulate a document, automatically extracts a search key, searches for related information, and automatically presents the results to the user. FIG. 15 shows a block diagram.

A related information search system 150, which comprises an input analyzing module 155, a related information searching module 154, and a search result displaying module 156, automatically extracts search keys from entered text, searches for related information, and presents the result to the user. An input device 151, a display unit 152, and a related information storage device 153 are the same as those shown in FIG. 14. The input analyzing module 155 performs dictionary-based morphemic analysis or pre-defined keyword matching analysis on the text entered via the input device 151 to extract search keys such as characters or words and sends them to the related information searching module 154. The related information searching module 154 searches the related information storage device 153 for information related to the search keys. This information includes text or (translation) sample sentences containing a search key and dictionary information containing a search key as a head word. The search result displaying module 156 displays the search result on the display unit 152.

(3) Third conventional system

A third conventional system is a related information search system disclosed in Japanese Patent Publication Kokai JP-A No. Hei 3-154152. This system, designed for use in a document formulating system with the kana-kanji translation (conversion) function, automatically searches for a sample of candidate kanji characters corresponding to the kana characters being entered. Rather than displaying the contents of the sample instantly, the system blinks or displays in reverse video to show the user merely the presence or absence of a sample of each candidate kanji character. Although a specific method for displaying the contents of a sample is not described in the publication, it is assumed that the user gives an instruction to display the contents of the sample.

SUMMARY OF THE DISCLOSURE

Following problems have been encountered during the course of the investigations toward the present invention.

The first conventional system described above allows the user to get and use related information while the user is formulating a document. However, whenever the user wants to search for related information, the system requires him to interrupt document formulation to enter a search key. This means that the system, although designed for helping the user formulate a document, prevents him from concentrating on document formulation. This problem is most serious when the search does not give the user any related information. This is because the first conventional system accepts a user instruction and then starts the search for related information. Thus, when no related information is obtained, the waiting time is entirely wasteful.

On the other hand, the second conventional system allows the user to get information related to entered text without requiring him to enter a search instruction or a search key explicitly. This means that the system gives the user related information without interrupting document formulation. However, the second conventional system, with an interface different from that of the first conventional system which is widely used today, is not easy to use for users who have been familiar with the first conventional system. In addition, the second conventional system, which automatically searches for related information without interrupting document formulation, immediately displays searched information to the user. So, when there is a large amount of related information, the system is likely to interrupt document formulation often.

In contrast to the above two systems, the third conventional system allows the user to get information on the presence or absence of information related to entered text without requiring the user to enter an explicit search instruction and a search key and without immediately displaying related information. Therefore, this system does not interrupt user document formulation more often than the above two systems.

However, although the third conventional system, which displays, not the contents of, but the presence or absence of, related information, does not interrupt user's document formulation, it distracts the user from concentration on the related information search. Therefore, the user often fails to notice the related information display and, after entering some amount of information, realizes that he should have searched related information. In addition, after completing a sentence, some users want to make a global reference to information related to the words etc. contained in that sentence. In such a case, the conventional system cannot even re-display the presence or absence of related information but requires the user to search for related information again, significantly decreasing the efficiency.

In view of the foregoing, it is an object of the present invention to provide a novel method and system for related information search, free of the disadvantages in the prior art.

Particularly, it is an object of the present invention to provide a related information search method and a related information search system which takes (i) advantage of the second conventional system which automatically extracts search keys before the user makes an explicit search request and automatically searches for related information to relieve the user of the search efforts, and (ii) advantage of the third conventional system which provides the user with information only on the presence and absence of related information to minimize the interruption of user's document formulation, (iii) while still maintaining a search interface of the first conventional system, the most popular related information search system available today, which searches for related information upon receiving a retrieval information from the user.

Still further objects of the present invention will become apparent in the entire disclosure.

According to one aspect of the present invention there is provided a method for searching for and displaying information related to a document to be formulated to help formulate the document (text), in which information related to a search key extracted by analyzing text entered by a user is searched for, a predetermined amount of the related information is stored, the presence or absence of the related information is indicated by a display format of an interaction element which accepts a search instruction from the user, and, in response to a user's operation on the interaction element, a search result corresponding to a current cursor position is displayed.

According to a second aspect of the present invention, more specifically, the method comprises the following steps.

(a) analyzing text entered by a user and extracting a search key;

(b) searching for related information by the extracted search key;

(c) storing search results collected by a plurality of immediately preceding search keys;

(d) selecting a display format of an interaction element from two display formats, a first display format (mode) and a second display format (mode), based on the search results collected by the plurality of stored search keys and on a current cursor position, the interaction element accepting a search instruction from the user, the first display format being displayed when there is no related information, the second display format being displayed when there is related information;

(e) changing the display format (mode) of the interaction element on a screen to the selected format (mode); and (f) displaying the search result in response to the search instruction entered by the user operating on the interaction element, based on the search results collected by the plurality of stored search keys and on the current cursor position.

In the related information search method according to the present invention described above, processing is performed as follows. First, text entered by the user is analyzed and a search key (or keys) is (are) extracted. Based on this extracted search key (or keys), related information is searched for and the search result is stored with the results of last several searches (last search, search before last, and so on). That is, the search results of a plurality of immediately preceding searches are stored. Then, based on the search results collected by the plurality of search keys and the current cursor position, the display format of an interaction element which accepts a search instruction from the user is selected (determined) from two display formats: the first display format (mode) which is displayed when there is no related and the second display format (mode) which is displayed when there is related information. More specifically, a search key corresponding to the current cursor position is selected from the plurality of stored search keys. If such a search key is found and if there is related information corresponding to the search key, the second display format (mode) is selected; if there is no related information, the first display format (mode) is selected. If such a search key is not found, the first display format is selected. Then, the interaction element on the screen is changed to the selected format (mode). In addition, in response to an instruction entered by the user operating on the interaction element, the search result is displayed based on the search results collected by the plurality of search keys and the current cursor position. That is, a search is performed for a search key corresponding to the current cursor position. If such a search key is found, the search result of the search key is displayed (The related information, if any, is displayed; if there is no such related information, a message indicating the condition (this effect)is displayed). If such a search key is not found, a message indicating the condition (for example, no related information) is displayed.

The first display format (mode) may indicate to the user that the interaction element is available for use. Or, alternatively, the first display format (mode) may indicate to the user that the interaction element is not available for use and the interaction element itself may be constructed as functionally inoperable, too.

The second display format may be one which simply indicates to the user that there is related information. In addition, the second display format may be one which indicates the number of related information items that have been searched for, the search method used, or the type of database from which related information was successfully obtained.

According to a further aspect of the present invention there is provided a related information search system which searches for and displays information related to a document under formulation to help formulate the document. The system comprises: an input analyzing module for analyzing text entered by a user and extracting a search key (or keys); a related information searching module for searching for related information by the extracted search key (or keys); a related information temporary storage module for storing search results collected by a plurality of immediately preceding search keys; a search instruction acceptance display controlling module for selecting a display format of an interaction element from two display formats, a first display format (mode) and a second display format (mode), based on the search results collected by the plurality of stored search keys and on a current cursor position, the interaction element accepting a search instruction from the user, the first display format being displayed when there is no related information, the second display format being displayed when there is related information; The system further comprises a search instruction accepting module for changing the display format of the interaction element on a screen to the selected format and for accepting the search instruction which is activated by the user operating on the interaction element; and a search result displaying module for displaying the search result in response to the search instruction entered by the user operating on the interaction element, based on the search results collected by the plurality of stored search keys and on the current cursor position.

The related information search system according to the present invention described above performs processing as follows. First, the input analyzing module analyses text entered by the user and extracts a search key (or keys). Based on this extracted search key (or keys), the related information searching module searches for related information, and the related information temporary storage module stores the search result with the results of last several searches. Then, based on the search results collected by the plurality of search keys and the current cursor position, the search instruction acceptance display controlling module selects the display format of the interaction element, which accepts a search instruction from the user, from two display formats: the first display format (mode) which is displayed when there is no related and the second display format (mode) which is displayed when there is related information. Then, the search instruction accepting module changes format of the interaction element on the screen to the selected format. In addition, in response to an instruction entered by the user operating on the interaction element, the search result displaying module displays the search result based on the search results collected (stored) by the plurality of search keys and the current cursor position.

BRIEF DESCRIPTION OF THE DRAWINGS

FIG. 7 is a flowchart showing an example of processing performed by a search result displaying module.

FIGS. 10(A)–10(B) are diagrams showing an embodiment of interaction elements.

FIGS. 11(A)–11(C) are diagrams showing an embodiment of interaction elements.

FIG. 14 is a block diagram of a first conventional system.

FIG. 15 is a block diagram of a second conventional system.

DETAILED DESCRIPTION OF THE PREFERRED EMBODIMENTS

An embodiment of the present invention is described below in detail with reference to the drawings.

Figure 1:
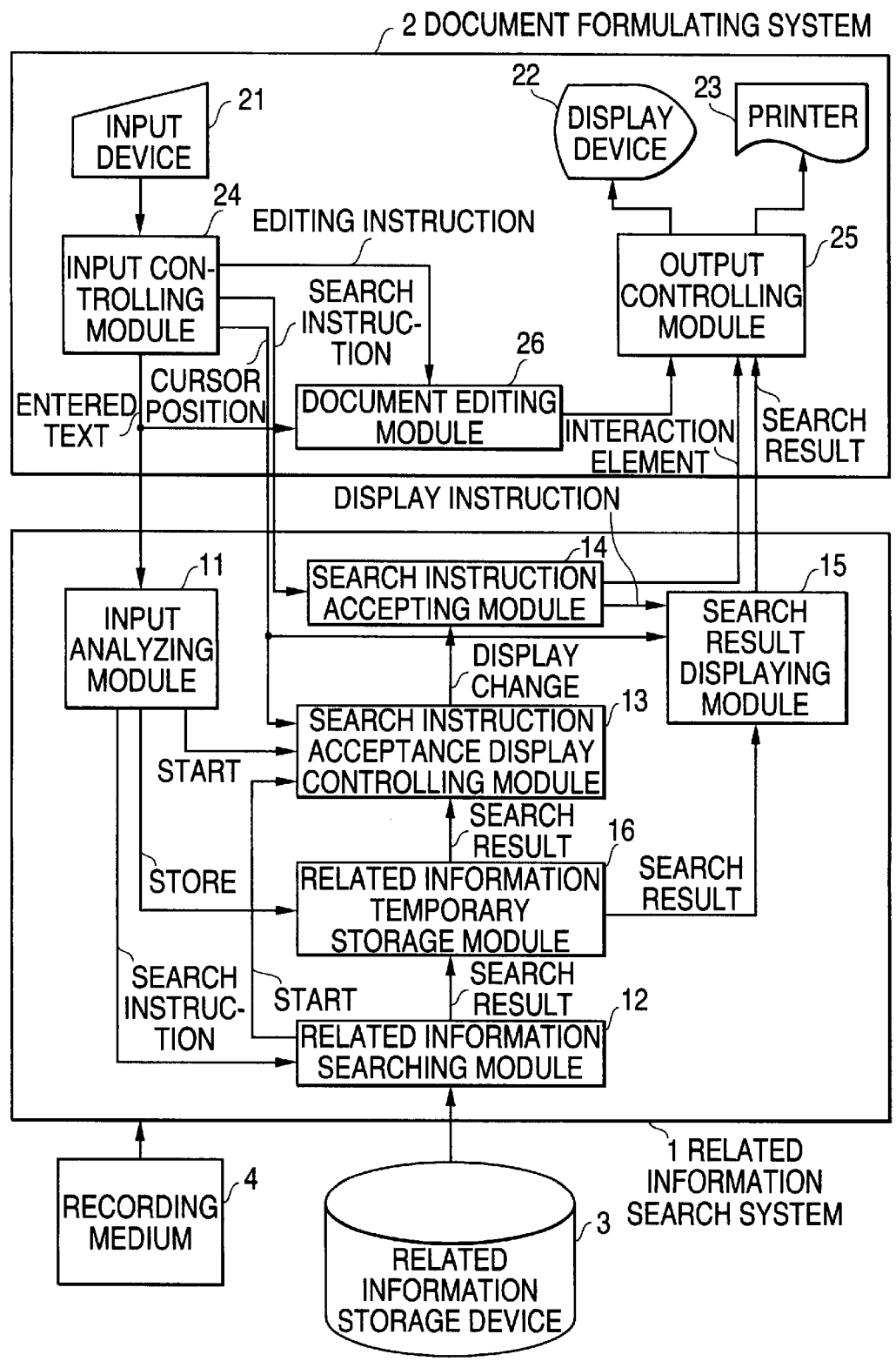
FIG. 1 is a block diagram showing an example of a document formulating system to which the present invention is applied.

FIG. 1 is a block diagram showing an example of a document formulating system to which the present invention is applied. As shown in the figure, the document formulating system in this example comprises a related information search system 1, a document formulating system 2, a related information storage device 3, and a recording medium 4.

The document formulating system 2, which allows a user to formulate (draft) and edit a document, comprises an input device 21 such as a pointing device, for example a mouse, and a keyboard, a display device 22 such as a CRT display, a printer 23 such as a laser printer, an input controlling module 24, an output controlling module 25, and a document editing module 26. When the user enters, from the input device 21, text and an editing instruction associated with a document to be created, they are sent to the document editing module 26 via the input controlling module 24. The document editing module 26 edits the entered text according to editing instructions. The output controlling module 25 displays text being edited on the display device 22. The printer 23 prints the formulated document on a paper according to a print output instruction issued from the user. The document formulating system 2 described above is widely used in a word processor or other devices.

On the other hand, the related information search system 1 and the related information storage device 3 are devices which aid the user in formulating a document. The related information storage device 3, a storage unit such as a hard disk or a CD-ROM, contains at least one database in which text, documents/(translation) sample sentences, dictionary information, words and kanji sample information, and so on are stored. The related information search system 1 receives text entered from the input device 21 via the input controlling module 24 of the document formulating system 2, automatically extracts a search key from this text, searches the data base in the related information storage device 3 for related information, and displays the searched related information on the display device 22 via the output controlling module 25.

The related information search system 1 in this embodiment comprises an input analyzing module 11, a related information searching module 12, a search instruction acceptance display controlling module 13, a search instruction accepting module 14, a search result displaying module 15, and a related information temporary storage module 16. The related information search system 1 like this may be implemented as a hardware component as well as a software component. When implemented the system as a software component, the recording medium 4 is used. The recording medium 4, a machine-readable recording medium such as a CD-ROM or a semiconductor memory device, contains a related information search program. The program, once read into a computer used to run the related information search system 1, controls the computer to implement the input analyzing module 11, related information searching module 12, search instruction acceptance display controlling module 13, search instruction accepting module 14, search result displaying module 15, and related information temporary storage module 16 in the related information search system 1.

Figure 2:
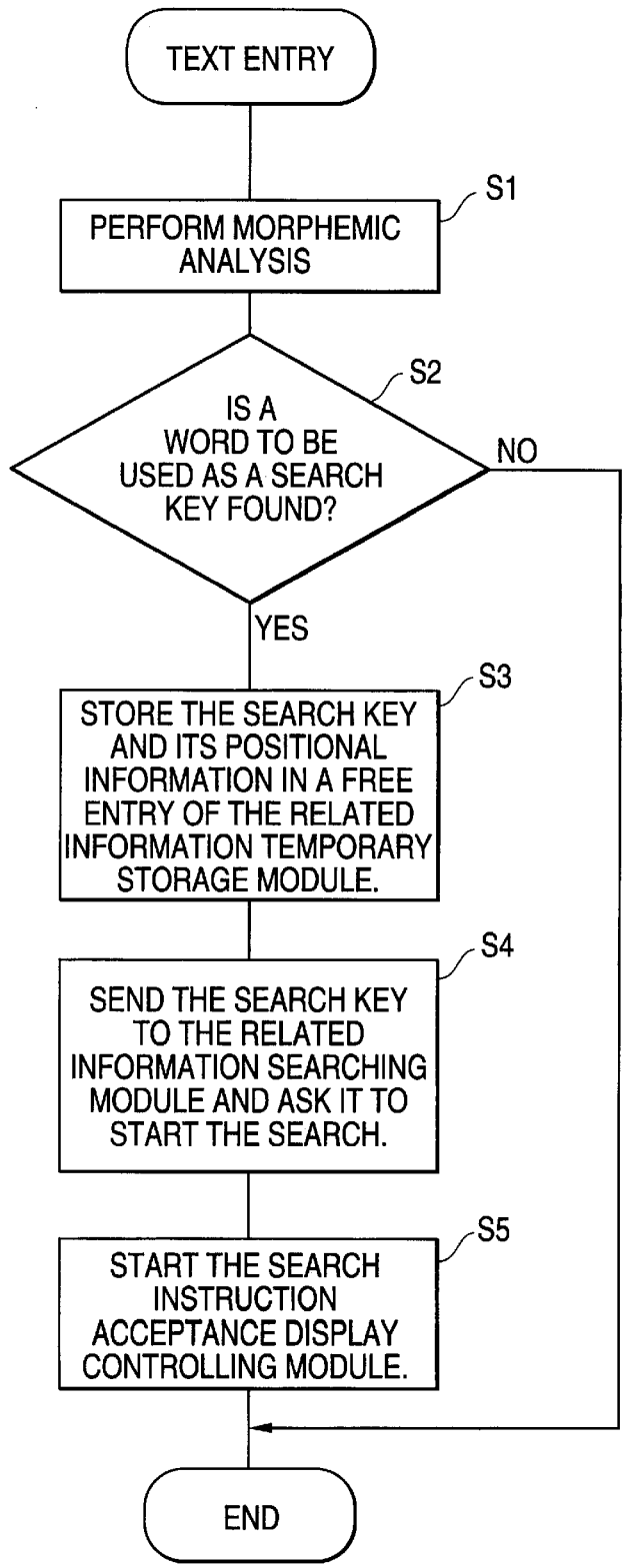
FIG. 2 is a flowchart showing an example of processing performed by an input analyzing module.

The input analyzing module 11 performs dictionary-based morphemic analysis or matching analysis with pre-defined group of keywords on the text entered via the input device 21 to extract search keys such as characters or words. FIG. 2 shows an example of the processing. In this example, assume that text (character strings) the user entered from the input device 21 and screen positional information on characters displayed on the screen are entered from the input controlling module 24.

When a new text (a character string) is entered, the input analyzing module 11 performs morphemic analysis on the text, while taking into consideration the text entered immediately before, to detect a new word to be used as the search key. (S1) An independent word such as a noun or a verb may be determined to be the search key immediately after the noun or the verb is detected or only when it matches one of the previously-defined keywords (keywords group) during the matching process. When the input analyzing module 11 finds a word to be used as a new keyword (YES in S2), the module stores the search key and its positional information (for example, the row and column numbers of the first word and last word of the search key in the document) into a free entry of the related information temporary storage module 16 (S3), sends the search key to the related information searching module 12, asks it to start the search (S4), and starts the search instruction acceptance display controlling module 13 (S5).

Figure 3:
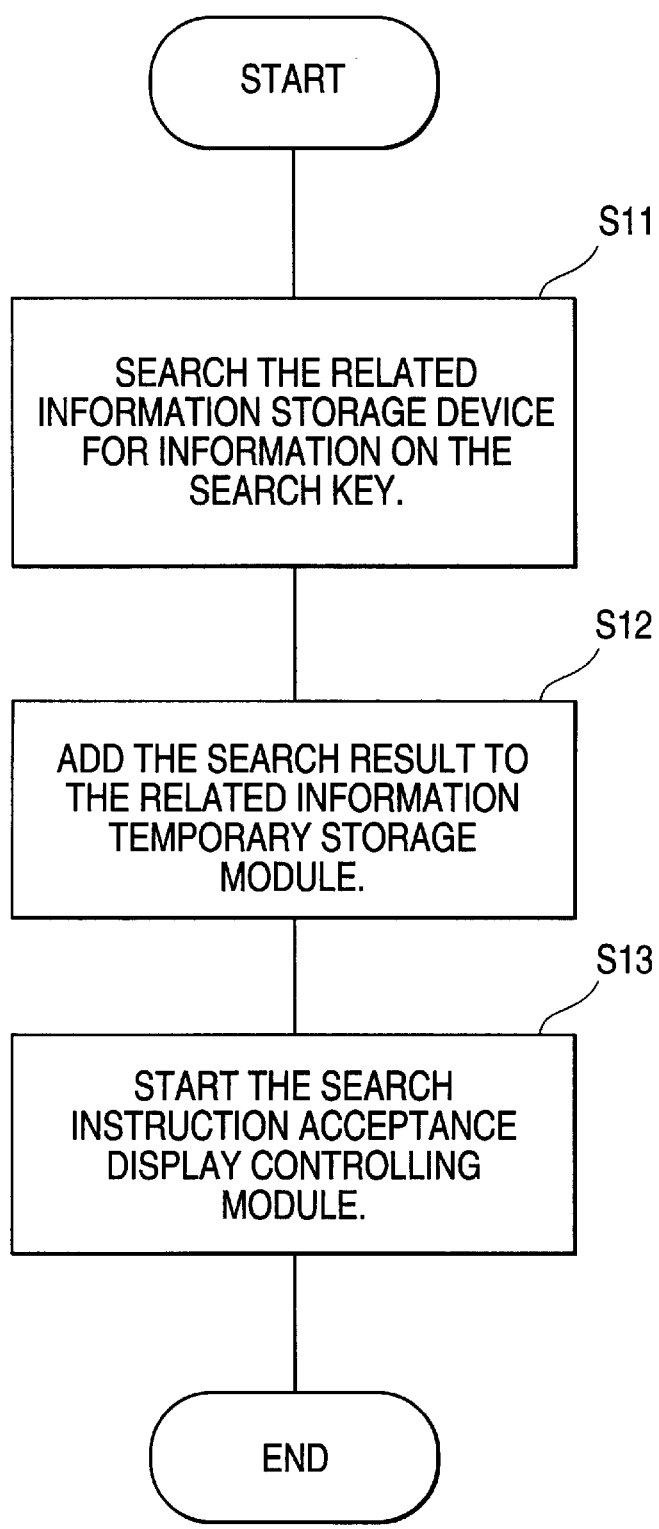
FIG. 3 is a flowchart showing an example of processing performed by a related information searching module.

The related information searching module 12 searches the database in the related information storage device 3 for information related to the search key. FIG. 3 shows an example of processing. Upon receiving a search instruction from the input analyzing module 11, the related information searching module 12 searches the database in the related information storage device 3 for information related to the received search key (S11). During this search operation, the module searches for text (or translation) sample sentences containing the search key or for dictionary information containing the search key as a head word. In addition to the one-stage search which is normally performed, the module may employ the following search method in which the two-stage search is performed.

(a) For example, when searching the dictionary, a complete-match search is performed to search for a word that completely matches the search key. If such a word is not found, a right-truncation search is performed to find a word whose left part matches the search word (a word whose first part matches the search key).

(b) A search is performed for a keyword previously stored in the database which matches the search key. If such a word is not found, a global search is made to search all text stored in the database for the search key.

(c) A search is performed to find a complete-match word. If such a word is not found, a fuzzy-match search is performed to find a word similar to the search key by allowing diverse expressions therefor, or a thesaurus or a similar-word dictionary is used to find an alternative word for the search key by expanding the search key.

In addition, not a single database but a plurality of similar databases may be searched. That is, one data base is searched first and, if no match is found, the next database is searched. For example, when searching for an English word, a search is made to find a matching word in an English-Japanese dictionary and, if no match is found, an English-English dictionary is searched. There are several other pairs of databases which may contain similar words. Examples are a Japanese dictionary and a dictionary of classical Chinese-Japanese, newspaper data and magazine data, a Japanese document and a foreign-language document, a system-prepared database and a user-prepared database.

When the search is finished, the related information searching module 12 stores the search result in the related information temporary storage module 16 (S12). At this time, the module stores into the related information temporary storage module 16 not only related information that was found but also additional information including the number of searched-for words, the used search method, and the type of database in which related information was found. Then, the related information searching module 12 starts the search instruction acceptance display controlling module 13 (S13).

Figure 4:
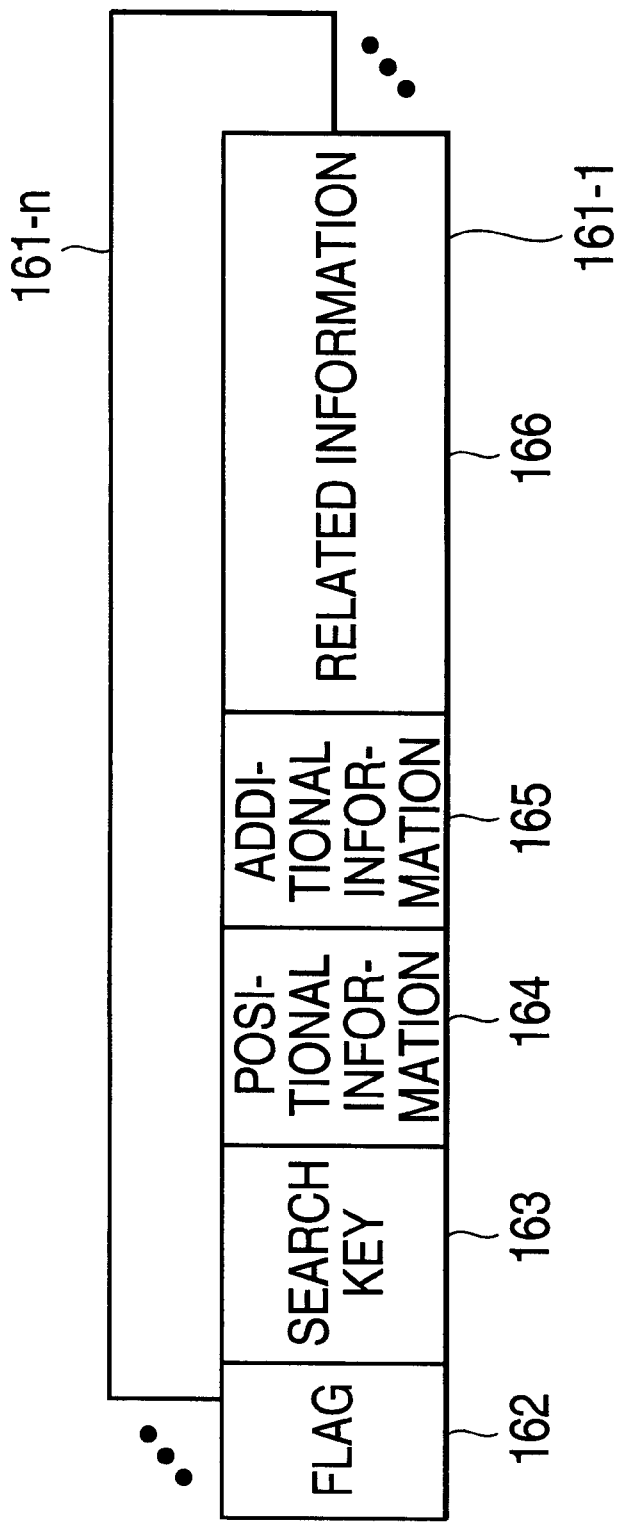
FIG. 4 is a diagram showing an example of the logical configuration of the related information searching module.

The related information temporary storage module 16 stores the search results collected by last several search keys. FIG. 4 shows an example of the logical configuration of a search result entry. The related information temporary storage module 16 contains a plurality of entries 161-1 to 161-n. Each entry is composed of a flag 162, a search key 163, positional information 164 indicating the position of the search key within the document, additional information 165, and related information 166. The search key 163 and the positional information 164 are stored by the input analyzing module 11, while the additional information 165 and the related information 166 by the related information searching module 12. The input analyzing module 11 checks the flag 162 to find a free entry. If all entries are used, the input analyzing module 11 makes the earliest used entry (i.e. oldest entry used most previously) free and uses it for a new entry.

Based on the search results collected by last several search keys and stored in the related information temporary storage module 16, the search instruction acceptance display controlling module 13 decides the display format (mode) of the interaction element which is displayed on the display device 22 to accept a search instruction from the user. Examples of interaction elements are interaction buttons and menus. Examples of display format changes include a change in the display color and in the overall appearance (This will be detailed later).

Figure 5:
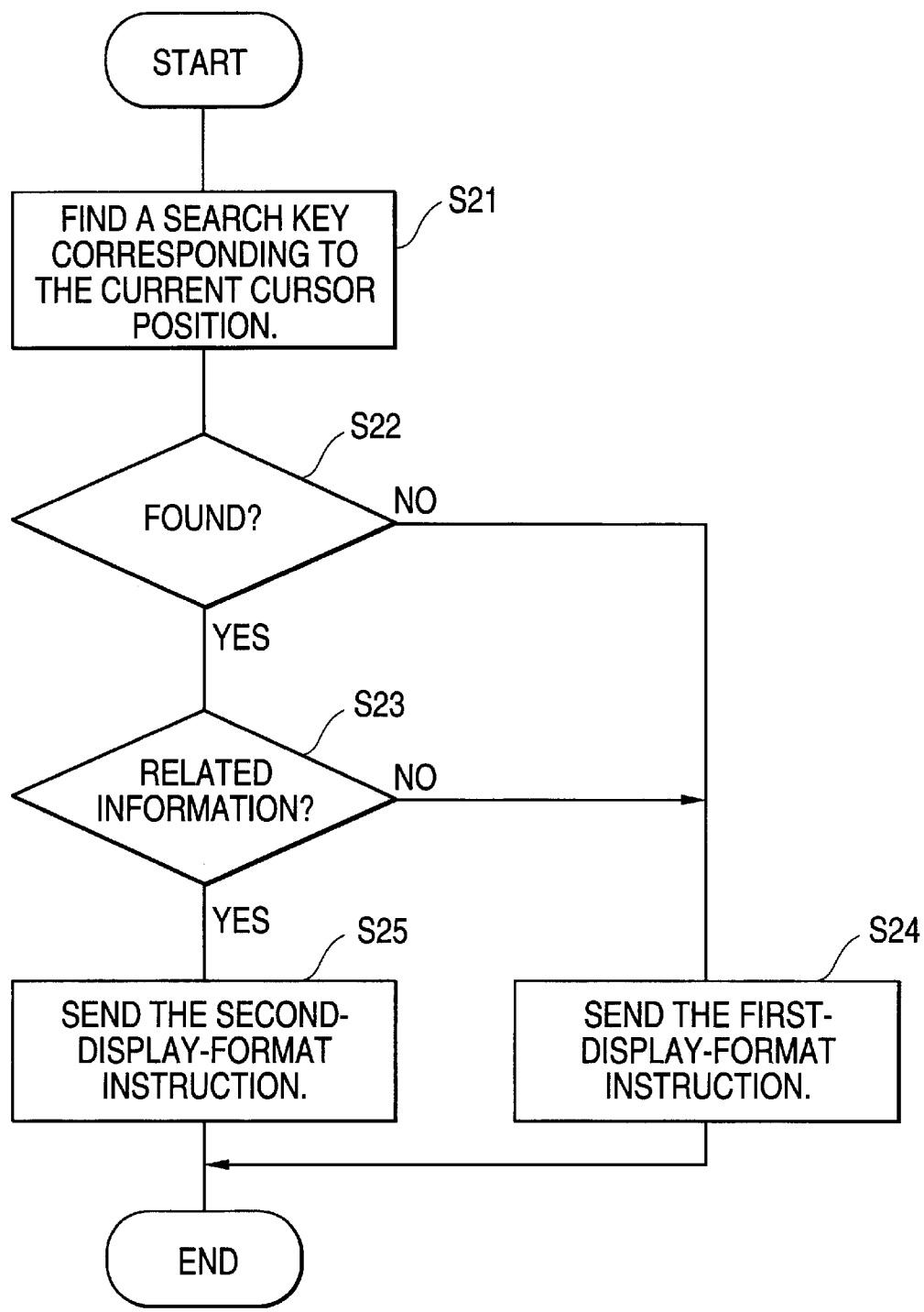
FIG. 5 is a flowchart showing an example of processing performed by a search instruction acceptance display controlling module 13.

FIG. 5 shows an example of processing performed by the search instruction acceptance display controlling module 13. When the search instruction acceptance display controlling module 13 is started by the input analyzing module 11 or by the related information searching module 12 or when the cursor moves, the module 13 starts the processing shown in FIG. 5. First, the module 13 searches the related information temporary storage module 16 for a search key corresponding to the current cursor position (S21). That is, the module searches the entries shown in FIG. 4 for an entry with the positional information 164 corresponding to the current cursor position. If such a search key is not found (NO in S22), the search instruction acceptance display controlling module 13 sends a first-display-format instruction to the search instruction accepting module 14. This mode indicates that there is no related information (S24). If there is such a search key (YES in S22) but if the related information field 166 of the entry contain no related information, that is, if the search fails (NO in S23), the search instruction acceptance display controlling module 13 also sends the first-displayformat (mode) instruction to the search instruction accepting module 14 (S24). On the other hand, if there is such a key and if the related information field 166 contains related information (YES in S23), the search instruction acceptance display controlling module 13 sends a second-display-format (mode) instruction to the search instruction accepting module 14. This format (mode) indicates that there is related information (S25).

Figure 6:
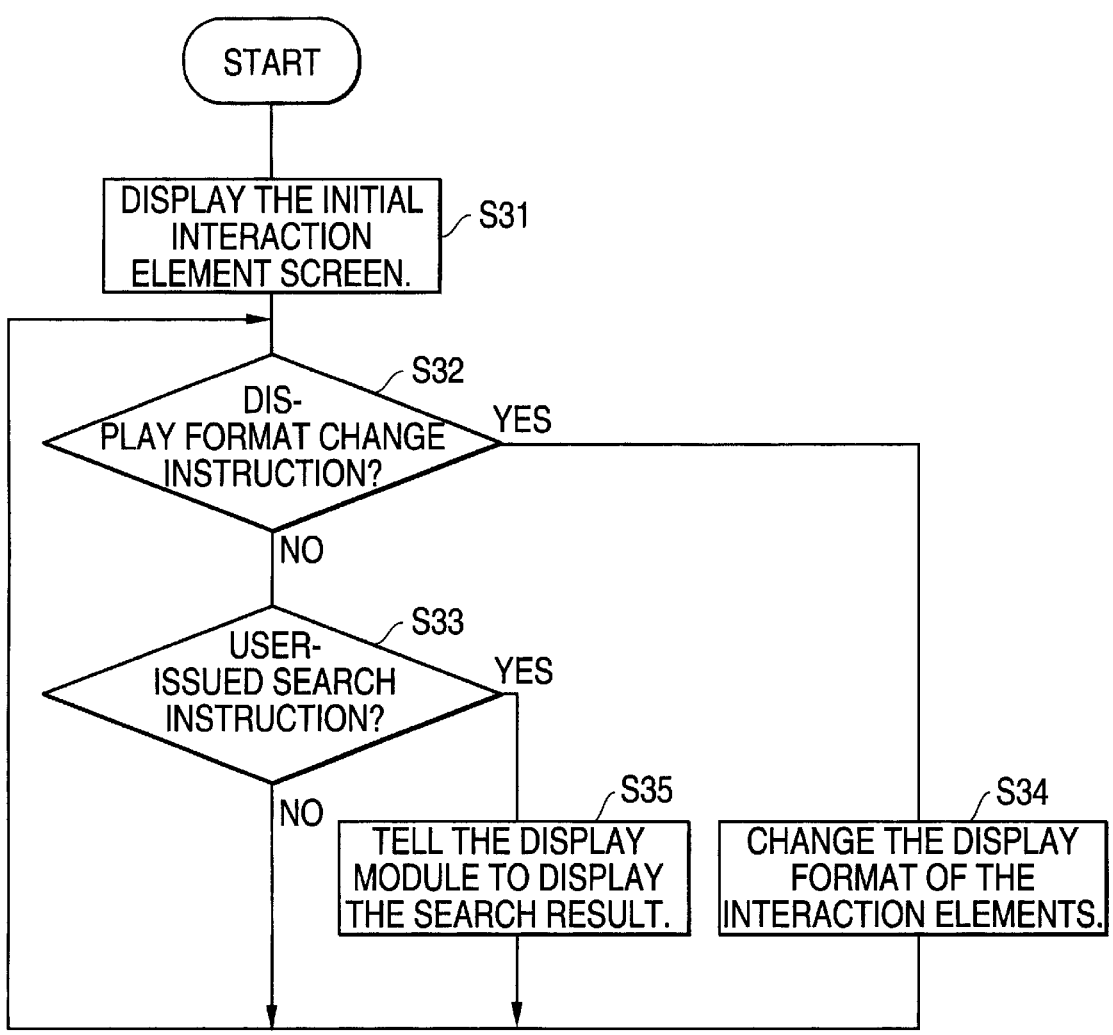
FIG. 6 is a flowchart showing an example of processing performed by a search instruction accepting module.

The search instruction accepting module 14 displays the interaction element on the display device 22 via the output controlling module 25 and accepts a search instruction from the user who manipulates the interaction element via the input controlling module 24. The search instruction accepting module 14 also changes the display format (mode) of the interaction element according to the format (mode) determined by the search instruction acceptance display controlling module 13. FIG. 6 shows an example of processing performed by the search instruction accepting module 14.

When the search instruction accepting module 14 starts operation, it first displays the initial interaction element screen on the display device 22 (S31). The interaction element is displayed on this initial screen, for example, in the first display format (mode). Then, the search instruction accepting module 14 starts monitoring if a display format change instruction is received from the search instruction acceptance display controlling module 13 (S32) or if a user-issued search instruction is received from the user as he or she manipulates the interaction element (S33). If the display format change instruction is received, the search instruction accepting module 14 changes the display format (mode) of the interaction element as instructed by the instruction (S34); if the user-issued search instruction is received, the search instruction accepting module 14 tells the search result displaying module 15 to display the search result (S35). Note that, if the first display format (mode) indicates explicitly to the user that the interaction element is unavailable for use and if the interaction element is functionally inoperable, the user-issued search instruction cannot be accepted while the interaction element is displayed in the first display format.

When the user issues a search instruction, the search result displaying module 15 displays the search result on the display device 22 via the output controlling module 25, based on the content stored in the related information temporary storage module 16 and on the current cursor position. FIG. 7 shows an example of this processing. Upon receiving a search result display instruction from the search instruction accepting module 14, the search result displaying module 15 first searches the related information temporary storage module 16 for a search key corresponding to the current cursor position (S41). That is, the module searches the entries shown in FIG. 4 for an entry whose positional information field 164 contains information corresponding to the current cursor position. If no such search key is found (NO in S42), the module displays on the screen a message indicating that there is no related information (S44). If there is such a search key (YES in S42) but if the related information field 166 of the entry contains no related information (NO in S4), the module also displays a message indicating that there is no related information (S44). On the other hand, if there is such a search key and if the entry contains related information (YES in S43), the module displays the related information on the screen (S45).

Next, the operation of the embodiment according to the present invention is described. For convenience, assume that the screen of the display device 22 is divided into two areas, a document formulating area 221 and a document formulation support area 222, and that the document formulating area 221 initially contains no text. A search button 223, an interaction element through which the user issues a search instruction, is constantly displayed at the top of the document formulation support area 222. The search button 223 takes one of two formats: the first display format (mode) which is white and the second display format (mode) which is black. Initially, the search button 223 is white. Assume that the user enters a sentence "□□□ is ○○" under this condition. □□□ and ○○ are words each of which is a search key.

Figure 8A:
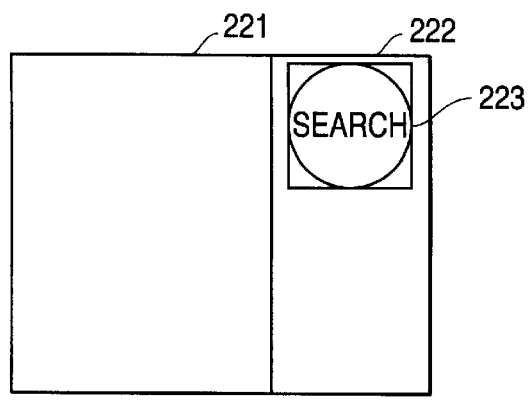
FIGS. 8(A)–8(D) show a screen explaining the operation of an embodiment of the present invention.
Figure 8B:
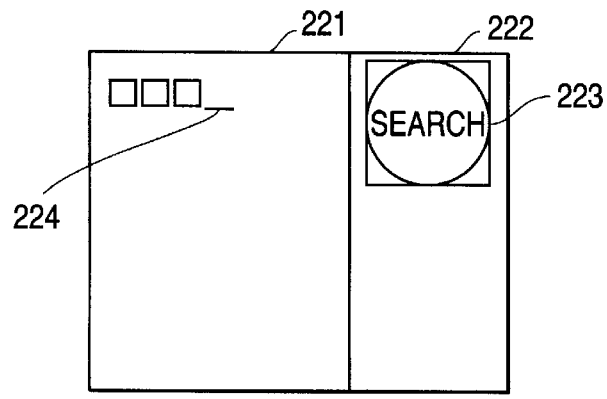

When the user enters □□□ from the input device 21 as shown in FIG. 8(b), the input analyzing module 11 analyzes the text part and identifies "□□□" as a search key (S1 and S2 in FIG. 2). The module adds the search key □□□ and its positional information to a free entry in the related information temporary storage module 16 (S3), asks the related information searching module 12 to search for information on □□□ and, at the same time, starts the search instruction acceptance display controlling module 13 (S4, S5). The search instruction acceptance display controlling module 13 gets □□□ as the search key corresponding to the current position of a cursor 224. However, because there is no related information for the search key, the module decides that the search button 223 is to be displayed in the first display format (mode) and sends a display format change instruction to the search instruction accepting module 14 (S21, S22, S23, and S24 in FIG. 5). Upon receiving this instruction, the search instruction accepting module 14 attempts to change the display format of the search button 223 to the first display format (S32 and S34 in FIG. 6). In this case, however, the search button 223, which is initially displayed in the first display format, remains unchanged as shown in FIG. 8(b).

Figure 8C:
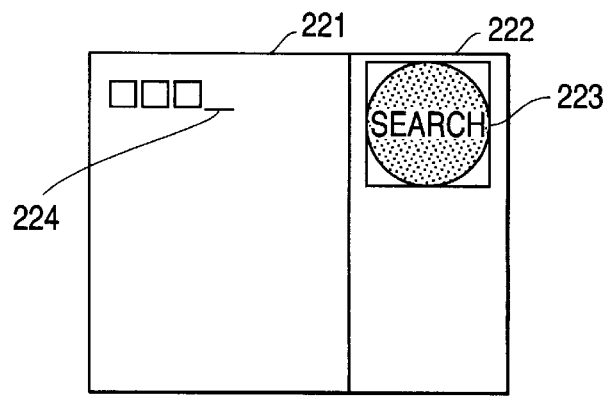

After that, the related information searching module 12 searches information on □□□ according to the steps shown in FIG. 3, stores the search result in the related information temporary storage module 16, and starts the search instruction acceptance display controlling module 13. Then, the search instruction acceptance display controlling module 13 executes the processing shown in FIG. 5 again. If the module finds that there is related information on □□□, it sends the display format change instruction to the search instruction accepting module 14 to change the display format of the search button 223 to the second format (mode). Upon receiving this instruction, the search instruction accepting module 14 changes the color of the search button 223 to black as shown in FIG. 8(c). This tells the user that there is information on □□□ that was entered by the user.

Figure 8D:
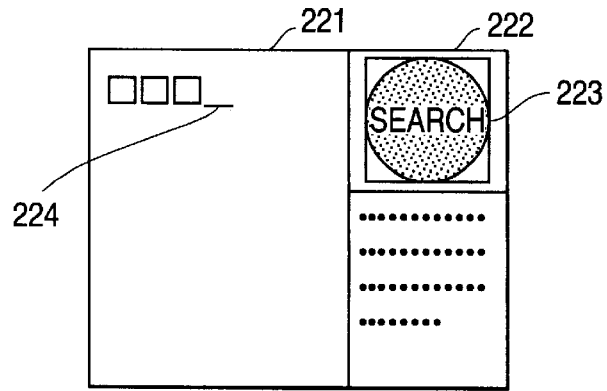

When the user clicks on the search button 223 via the input device 21, such as a mouse, to view the related information, the search instruction accepting module 14 sends the search result display instruction to the search result displaying module 15 (S33, S35 in FIG. 6). The search result displaying module 15 finds the search key a □□□ corresponding to the current position of the cursor 224 in the related information temporary storage module 16 and displays the related information in the bottom half of the document formulation support area 222 as shown in FIG. 8(d) (S45 in FIG. 7), enabling the user to view the related information on □□□.

Figure 9A:
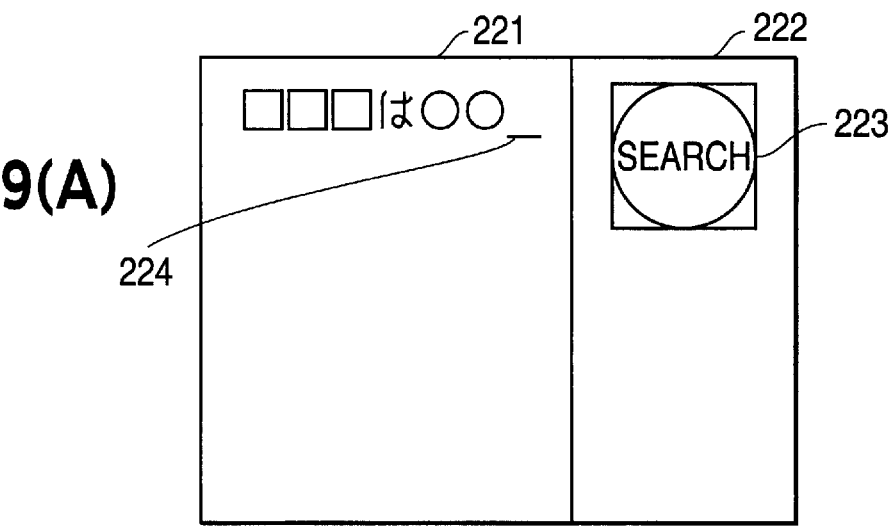
FIGS. 9(A)–9(B) show a screen explaining the operation of the embodiment of the present invention.
Figure 9B:
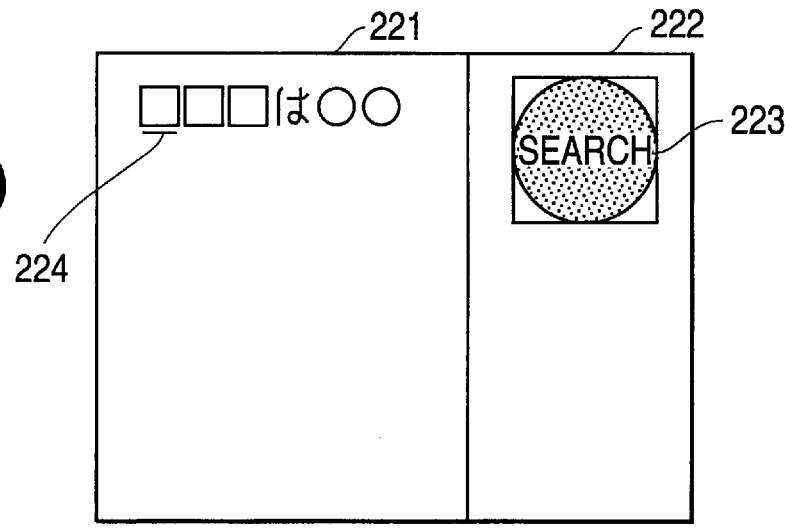

Then, if the user keeps on entering text and enters the sentence up to ○○, the related information search system 1 performs the same processing as that for □□□. For example, if there is no related information on ○○, the search button 223 is changed to the first display format (mode) as shown in FIG. 9(a) and is displayed in white.

Assume that the user did not check the presence of related information on □□□, that the user keeps on entering text, and that, at a later time, the user wants to know the presence of related information. At the time the user has entered ○○, the search button 223 no longer displays whether or not there is related information on a □□□. To get information on □□□, the user must backspace the cursor to any character in □□□. This cursor movement causes the search instruction acceptance display controlling module 13 to do the processing shown in FIG. 5. That is, the module checks the related information temporary storage module 16 to find the search key □□□ corresponding to the new position of the cursor 224, finds that related information is available, and requests the search instruction accepting module 14 to change the display format to the second format (mode). In response, the search instruction accepting module 14 changes the search button 223 to the second display format as shown in S34 in FIG. 6. This tells the user that there is related information on □□□, allowing him or her to click on the search button 223 to view related information on the screen.

As described above, the user can re-check the presence of related information on a previously-entered word at a later time and display its related information if any. The number of words that can be re-checked depends on the capacity of the related information temporary storage module 16 (number of entries).

FIGS. 10 to 13 show the embodiments of the interaction element. In the following description, the search button (icon) is explained as an example of the interaction element displayed on the display device 22 for accepting search instructions from the user. Other interaction elements include menus.

The search buttons shown by (1) to (7) in FIG. 10 are pairs of the first display format (mode) button and the second display format (mode) button displayed on the display device 22. Each pair shows a unique combination of display formats. Column (A) contains buttons in the first display formats. That is, these formats are displayed when the search is not yet performed or when no related information is found during the search. Column B contains the second display formats. That is, these formats are used when related information is found.

The pair of search buttons shown by (1) in FIG. 10 is an example in which the color of the search button is changed depending upon whether or not there is related information. To attract user's attention, light colors such as white or gray are used when there is no related information, and heavy colors such as red when there is related information. Although the color inside the button is changed in this example, the color of other parts such as the frame may be changed.

The pair of search buttons shown by (2) in FIG. 10 is an example in which the shape of the search button is changed depending upon whether or not there is related information. The pair of search buttons shown by (3) in FIG. 10 is an example in which the size of the search button is changed depending upon whether or not there is related information.

The pair of search buttons shown by (4) in FIG. 10 is an example in which the typeface or font of the characters in the search button is changed depending upon whether or not there is related information. The pair of search buttons shown by (5) in FIG. 10 is an example in which the color of the characters is changed depending upon whether or not there is related information. Using a heavy color when there is related information is more effective. Other methods include changing the character size or displaying the characters in reverse video.

The pair of search buttons shown by (6) in FIG. 10 is an example in which the character format of the search button is changed depending upon whether or not there is related information. In this example, an erase line is drawn over the character "Search" to indicate that there is no related information. Other character formats include underlining and shading.

The pair of search buttons shown by (7) in FIG. 10 is an example in which a message is displayed when there is related information. In this example, a message is displayed only when there is related information. The message "No related information" may also be displayed when there is no related information. Instead of constantly displaying the message, a balloon message may be displayed only when the user points to the search button with a pointing device such as a mouse.

A change in the color, shape, and/or size of the search button, a change in the typeface, font, color, and/or format of the characters on the search button, and whether or not a message is displayed may be combined. In addition, the color and/or size of the message area, and the typeface and/or color of the message, may also be changed.

Using various types of display formats for the search button allows the user to intuitively understand the presence or absence of related information, making it possible for him or her to issue a search instruction to get related information only when related information is available. Note that, when any of the display formats in FIG. 10 is used, information in the additional information field 165 shown in the configuration example of the related information temporary storage module 16, shown in FIG. 4, is basically unnecessary.

When not only the display format (mode) is changed but also the operability of the search button is switched, the characters or the button is grayed as in (5) in FIG. 10 or the erase line appears as in (6) in FIG. 10. This display format visually tells the user that the search button is inoperable, significantly improving effectiveness.

The search buttons shown in (1) and (2) of FIG. 11 are the examples of the second display format (mode) in which the format is changed according to the amount of related information. Column (A) shows the search buttons in the first display format (mode) that is used when the search is not yet performed or when no related information was found during the search. Columns (B) and (C) show the search buttons in the second format that is used when related information is available.

In example (1) in FIG. 11, the number of related information items obtained as a result of the search is displayed on the button. Although a number is not displayed in the first display format (mode) when there is no related information, "0" may be displayed to explicitly indicate that there is no related information. Changing the typeface, color, and font of the number according to the number of related information items further increase the effectiveness.

In example (2) in FIG. 11, the color of the characters ("Search" in the figure) on the search button is changed according to the number of related information items obtained as a result of the search. As the number of related information items increases, the color becomes deeper, as in (A) --> (B) --> (C) or, for each predetermined number of related information items, the color changes. Although only the color of the characters changes in this embodiment, the color, shape, and/or size of the search button may be changed, the typeface, font, and/or format of the characters on the search button may be changed, or whether or not a message is displayed may be changed. Combining all these functions further improve the effectiveness.

When the display format is changed, as in FIG. 11, according to the number of related information items, the related information searching module 12 adds the number of related information items to the additional information field 165 of the configuration example, shown in FIG. 4, of the related information temporary storage module 16. The search instruction acceptance display controlling module 13 references the additional information to determine the display format (mode).

Figure 12C:
FIGS. 12(A)–12(C) are diagrams showing an embodiment of interaction elements.
Figure 12B:
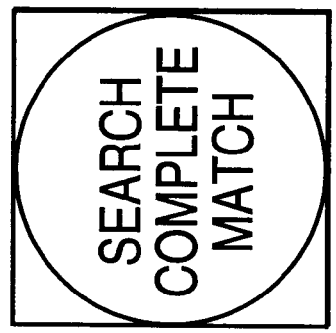
Figure 12A:
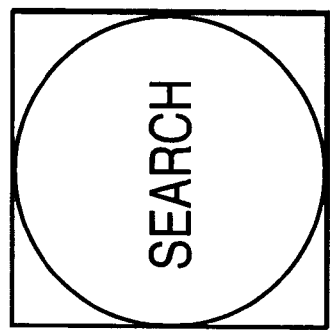

FIG. 12 shows an example in which the search method used by the related information searching module 12 is explicitly displayed on the search button displayed on the display device 22. Format (A) indicates the first display format (mode), meaning that the search is not yet performed or no related information is available as a result of the search. Formats (B) and (C) indicate the second display format (mode), meaning that related information is available.

In FIG. 12, the search method used by the related information searching module 12 is displayed on the button. For example, during the dictionary search, the related information searching module 12 first searches the dictionary for a word exactly matching the search key and, if no such word is found, the module searches the dictionary for a word whose first part matches that of the search key (right truncation search method). This type of display allows the user to determine not to reference related information if the related information is found as a result of the right truncation search method. This enables the user to avoid such a case where a large amount of information has been obtained as a result of the search instruction but only unnecessary information with an unintended search method. Other differences in the search method are: "search for a match with one of the previously-stored keywords" and "search through all sentences for a match", "search for words exactly matching with the search key" and "fuzzy search allowing for fuzzy matches (i.e., absorbing fluctuations in the expression)" or "search key expansion with the use of a thesaurus."

In this example, the name of a search method is displayed on the button. Depending upon a search method to be used, the color, shape, and/or size of the search button, the typeface, font, color, and/or format of the characters on the search button, or whether or not a message is displayed may be changed. Combining these functions further increases the effectiveness.

When the display format (mode) is changed, as in FIG. 12, according to the display method used, the related information searching module 12 adds the display method to the additional information field 165 of a configuration example, shown in FIG. 4, of the related information temporary storage module 16. The search instruction acceptance display controlling module 13 references the additional information to determine the display format (mode).

Figure 13C:
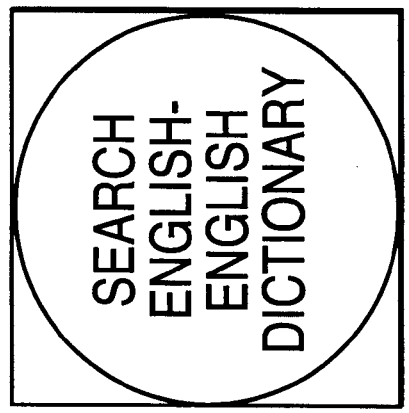
FIGS. 13(A)–13(C) are diagrams showing an embodiment of interaction elements.
Figure 13B:
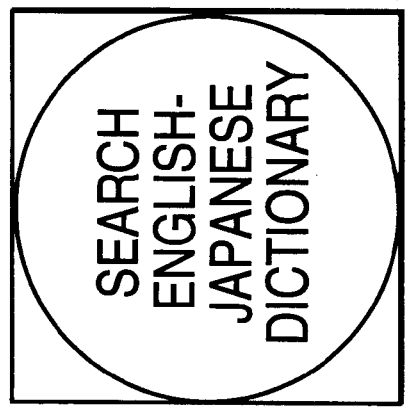
Figure 13A:
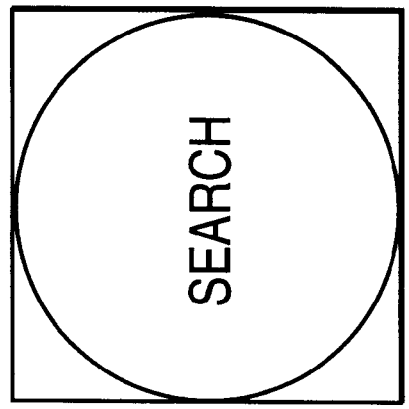

FIG. 13 shows an example in which the name of a database from which the related information searching module 12 has obtained information is shown on the search button displayed on the display device 22. Format (A) is an example of the first display format (mode) that is used when the search is not yet performed or when no related information is obtained as a result of the search. Formats (B) and (C) are examples of the second display format (mode) that is used when related information is available.

In FIG. 13, the name of a database from which the related information searching module 12 has obtained related information is displayed on the button. For example, during a search for an English word, the related information searching module 12 first searches the English-Japanese dictionary for a word exactly matching the search key and, if no such word is found, the module searches the English-English dictionary. This type of display allows the user to determine to reference related information only when the word is found in the English-Japanese dictionary. This enables the user to avoid such a case where a large amount of information has been obtained as a result of the search instruction but only unnecessary information obtained from an unintended database. Other pairs of like databases include a plurality of like dictionaries, a Japanese dictionary and a dictionary of classical Chinese-Japanese, newspaper data and magazine data, Japanese documents and non-Japanese documents, and system-prepared databases and user-prepared databases etc.

In this example, the name of a database is displayed on the button. Depending upon a database from which related information is obtained, the color, shape, and/or size of the search button, the typeface, font, color, and/or format of the characters on the search button, or whether or not a message is displayed may be changed. Combining these functions further increases the effectiveness.

When the display format is changed, as in FIG. 13, according to the difference in the database from which related information is obtained, the related information searching module 12 adds the name of the database to the additional information field 165 of a configuration example, shown in FIG. 4, of the related information temporary storage module 16. The search instruction acceptance display controlling module 13 references the additional information to determine the display format (mode).

In the examples in FIG. 10 to FIG. 13, the search key with which the search key is currently associated is not shown explicitly. This is because the user is able to identify the search key by the current cursor position. In another preferred mode, the characters indicating the current search key (that is, a word within the text) with which the search button is currently associated may be shown on or near the search button.

The invention described above provides the following advantages.

A search for related information is initiated by a search instruction from the user. This standard search interface ensures easy operation.

The system according to the present invention automatically extracts a search key (or keys) and starts a search for related information before the user enters an explicit search request, thus saving labor in the search operation.

The system gives the user the information on the presence or absence of related information first and then the related information only when it is requested. This minimizes an interruption to the user's document formulating work.

When the user fails to check the contents of related information on a word, the user may backspace the cursor to the word to view an interaction element showing whether or not there is related information. If related information is available, the user may display it simply by manipulating the interaction element.

In a configuration in which the first display format (mode) of the interaction element is designed to explicitly indicate to the user that the interaction element is unavailable for use and in which the interaction element is made to be functionally inoperable, the user does not have to manipulate the interaction element when there is no related information.

The number of related information items may be shown on the search button in the second display format (mode) to give the user the information on the number of available related items in advance. This function allows the user to bypass (eliminate) the search for related information when the number of related information items is small.

Information on a search method used in searching for related information may be shown on the search button in the second display format. This function allows the user to bypass (jump) the search with an unintended search method.

Information on a database from which related information has been obtained may be shown on the search button in the second display format. This function informs the user of the type of the database and therefore eliminates the need for searching a database that is not intended.

It should be noted that modification obvious in the art may be done without departing the gist and scope of the present invention as disclosed herein and claimed hereinbelow as appended.

What is claimed is:

1. A related information search method, comprising:
   entering text by a user, the text corresponding to at least a portion of the document under formulation;
   searching for and displaying information related to the document under formulation to help formulate the document;
   analyzing the text entered by the user;
   searching for information related to a search key extracted based on the text that was analyzed;
   storing a predetermined amount of the related information;
   indicating the presence or absence of the related information by a display format of an interaction element which accepts a search instruction from the user; and
   displaying a search result corresponding to a current cursor position in response to a user's operation on the interaction element,
   wherein the presence or absence of the related information and not the search result is provided on the display format prior to the user's operation, and
   wherein the search result is displayed after the user's operation.

2. A related information search method for searching for and displaying information related to a document under formulation to help formulate the document, the method comprising the steps of:
   (a) analyzing text entered by a user and extracting a search key;
   (b) searching for related information by the extracted search key;
   (c) storing search results collected by a plurality of immediately preceding search keys;
   (d) selecting a display format of an interaction element from two display formats, a first display format and a second display format, based on the search results collected by said plurality of stored search keys and on a current cursor position, the interaction element accepting a search instruction from the user, the first display format being displayed when there is no related information, the second display format being displayed when there is related information;
   (e) changing the display format of the interaction element on a screen to the selected format; and
   (f) displaying the search result in response to the search instruction entered by the user operating on the interaction element, based on the search results collected by said plurality of stored search keys and on the current cursor position.

3. A related information search method as defined by claim 2, wherein said display format selection step (d) comprises the steps of:
   finding the search key corresponding to the current cursor position from the plurality of stored search keys;
   when the search key is found, selecting the second display format if there is the related information corresponding to the search key or the first display format if there is no related information, and
   when the search key is not found, selecting the first display format; and wherein said search result display step (f) comprises the steps of:
   finding the search key corresponding to the current cursor position from said plurality of stored search keys; and
   when the search key is found, displaying the search result corresponding to the search key.

4. A related information search method as defined by claim 2 wherein said first display format indicates explicitly to the user that the user cannot operate on the interaction element and the interaction element is made to be functionally inoperable.

5. A related information search method as defined by claim 3 wherein said first display format indicates explicitly to the user that the user cannot operate on the interaction element and the interaction element is made to be functionally inoperable.

6. A related information search method as defined by claim 2, wherein said second display format displays the number of related information items that have been searched for.

7. A related information search method as defined by claim 3, wherein said second display format displays the number of related information items that have been searched for.

8. A related information search method as defined by claim 4, wherein said second display format displays the number of related information items that have been searched for.

9. A related information search method as defined by claim 2, wherein said second display format displays a search method used during the search.

10. A related information search method as defined by claim 3, wherein said second display format displays a search method used during the search.

11. A related information search method as defined by claim 4, wherein said second display format displays a search method used during the search.

12. A related information search method as defined by claim 2, wherein said second display format displays the type of a database from which information was successfully searched.

13. A related information search method as defined by claim 3, wherein said second display format displays the type of a database from which information was successfully searched.

14. A related information search method as defined by claim 4, wherein said second display format displays the type of a database from which information was successfully searched.

15. A related information search system which searches for and displays information related to a document under formulation to help formulate the document, the system comprising:
   (a) an input analyzing module analyzing text entered by a user and extracting a search key;

(b) a related information searching module searching for related information by the extracted search key;

(c) a related information temporary storage module storing search results collected by a plurality of last search keys;

(d) a search instruction acceptance display controlling module selecting a display format of an interaction element from two display formats, a first display format and a second display format, based on the search results collected by said plurality of stored search keys and on a current cursor position, the interaction element accepting a search instruction from the user, the first display format being displayed when there is no related information, the second display format being displayed when there is related information;

(e) a search instruction accepting module changing the display format of the interaction element on a screen to the selected format and for accepting the search instruction which is activated by the user operating on the interaction element; and (f) a search result displaying module displaying the search result in response to the search instruction entered by the user operating on the interaction element, based on the search results collected by said plurality of stored search keys and on the current cursor position.

16. A computer-readable medium having stored therein a program which causes a computer system to perform a program comprising the steps of:

(a) analyzing text entered by a user and extracting a search key;

(b) searching for related information by the extracted search key;

(c) storing search results collected by a plurality of last search keys;

(d) selecting a display format of an interaction element from two display formats, a first display format and a second display format, based on the search results collected by said plurality of stored search keys and on a current cursor position, the interaction element accepting a search instruction from the user, the first display format being displayed when there is no related information, the second display format being displayed when there is related information;

(e) changing the display format of the interaction element on a screen to the selected format; and (f) displaying the search result in response to the search instruction entered by the user operating on the interaction element, based on the search results collected by said plurality of stored search keys and on the current cursor position.

* * * * *